United States Patent
Cudak et al.

(10) Patent No.: US 9,148,749 B2
(45) Date of Patent: *Sep. 29, 2015

(54) EVALUATING WIRELESS NETWORK ACCESS CONNECTIONS VIA NEAR FIELD COMMUNICATIONS

(71) Applicant: INTERNATIONAL BUSINESS MACHINES CORPORATION, Armonk, NY (US)

(72) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/629,833

(22) Filed: Sep. 28, 2012

(65) Prior Publication Data

US 2014/0094115 A1 Apr. 3, 2014

(51) Int. Cl.
H04B 5/00 (2006.01)
H04W 4/00 (2009.01)
H04B 7/00 (2006.01)
H04B 15/00 (2006.01)
H04L 29/06 (2006.01)

(52) U.S. Cl.
CPC .......... *H04W 4/008* (2013.01); *H04L 63/0272* (2013.01)

(58) Field of Classification Search
USPC ............................. 455/41.1, 41.2, 41.3, 456.2
See application file for complete search history.

(56) References Cited

U.S. PATENT DOCUMENTS

| 7,793,352 B2 | 9/2010 | Chevalier et al. | |
|---|---|---|---|
| 8,116,679 B2 | 2/2012 | Dunko | |
| 8,184,560 B2 | 5/2012 | Shaw | |
| 2004/0116073 A1 | 6/2004 | Mauney et al. | |
| 2006/0045050 A1* | 3/2006 | Floros et al. | 370/332 |
| 2006/0045051 A1 | 3/2006 | Floros et al. | |
| 2006/0183462 A1* | 8/2006 | Kolehmainen | 455/411 |

(Continued)

OTHER PUBLICATIONS

Nokia Corporation, et al., "An Improved Mechanism to Allow Coexistence Between Bluetooth and WiMax Using Power Saving", IP.Com Prior Art Database, May 5, 2008, pp. 1-4, IP.com, IP.com No. IPCOM000169972D.

(Continued)

*Primary Examiner* — Ayodeji Ayotunde
(74) *Attorney, Agent, or Firm* — Edward J. Lenart; Kennedy Lenart Spraggins LLP (57) ABSTRACT

Evaluating wireless network access connections via near field communications, including: identifying, by a requesting device, one or more network connections available to the requesting device; requesting, by the requesting device to one or more responding devices using a near field communications connection, information describing the performance of the network connections experienced by the one or more responding devices; receiving, by the requesting device, the information describing the performance of the network connections experienced by the one or more responding devices; and connecting, by the requesting device, to a preferred network connection in dependence upon the information describing the performance of the network connections experienced by the one or more responding devices.

11 Claims, 3 Drawing Sheets

(56) References Cited

U.S. PATENT DOCUMENTS

2008/0002758 A1* 1/2008 Schmidt et al. ............... 375/130
2008/0026768 A1   1/2008 Fok et al.
2011/0161974 A1* 6/2011 Kurabayashi et al. ........ 718/104

OTHER PUBLICATIONS

Chander, D. et al., "Spatio-Temporally Adaptive Waiting Time for Cell Phone Sensor Networks", International Journal of Distributed Sensor Networks, vol. 2011, Article ID 962476, Mar. 2011, pp. 1-21, Hindawi Publishing Corporation, DOI:10.1155/2011/962476.

Anonymous, "Notebook Driven Bluetooth Wireless Technology Enabled WiFi Access Point Configuration and Management", IP.Com Prior Art Database, Dec. 8, 2006, pp. 1-3, IP.com No. IPCOM000143801D.

Microsoft, "Set up a computer-to-computer (ad hoc) network", microsoft.com (online), [accessed Aug. 8, 2012], 2 pp., URL: http://windows.microsoft.com/en-US/windows-vista/Set-up-a-computer-to-computer-ad-hoc-network.

* cited by examiner

EVALUATING WIRELESS NETWORK ACCESS CONNECTIONS VIA NEAR FIELD COMMUNICATIONS

BACKGROUND OF THE INVENTION

1. Field of the Invention

The field of the invention is data processing, or, more specifically, methods, apparatus, and products for evaluating wireless network access connections via near field communications.

2. Description of Related Art

Modern computing devices are able to connect to data communications in a variety of ways. Computing devices may connect to data communications using wired connections and wireless connections. Computing devices that connect to data communications networks using wireless connections may identify a plurality of potential access points for wirelessly connecting to a data communications network. Many computing devices will select a particular access point to connect to the data communications network based on criteria such as signal strength, with no understanding of the actual quality of service that will be delivered through such a connection.

SUMMARY OF THE INVENTION

Methods, apparatus, and products for evaluating wireless network access connections via near field communications, including: identifying, by a requesting device, one or more network connections available to the requesting device; requesting, by the requesting device to one or more responding devices using a near field communications connection, information describing the performance of the network connections experienced by the one or more responding devices; receiving, by the requesting device, the information describing the performance of the network connections experienced by the one or more responding devices; and connecting, by the requesting device, to a preferred network connection in dependence upon the information describing the performance of the network connections experienced by the one or more responding devices.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
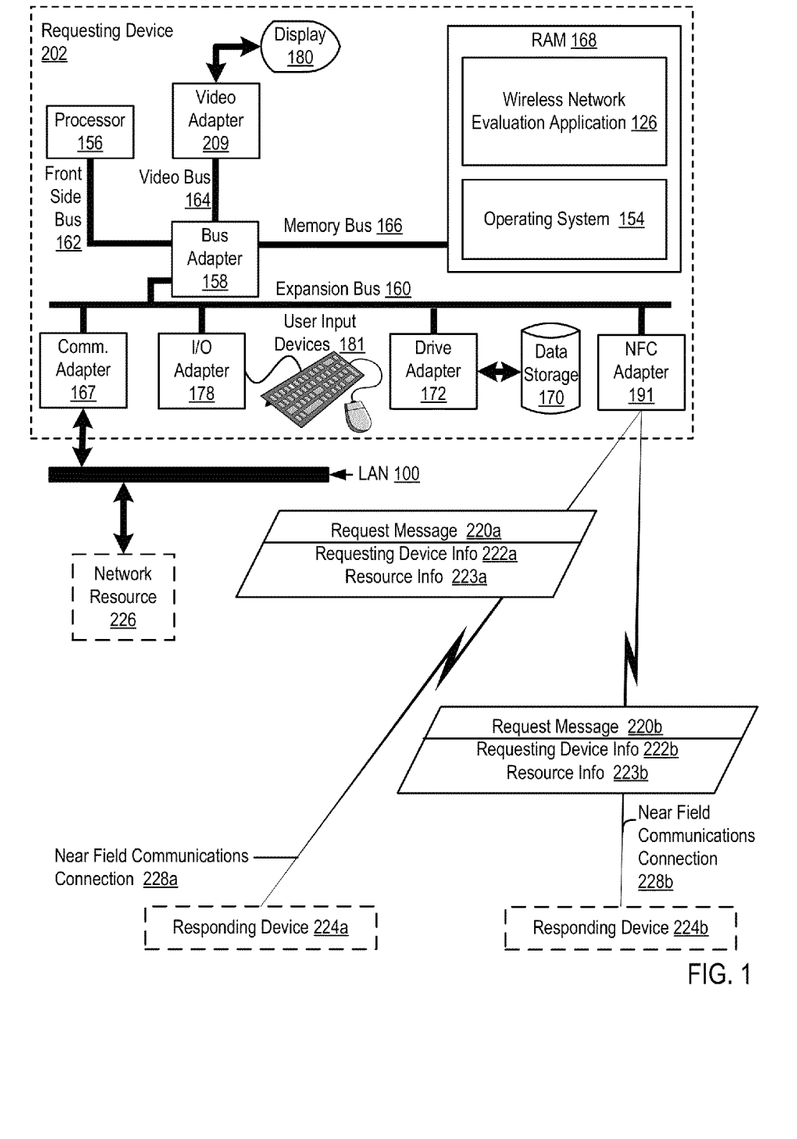
FIG. 1 sets forth a block diagram of automated computing machinery comprising an example computer useful in evaluating wireless network access connections via near field communications according to embodiments of the present invention.

Example methods, apparatus, and products for evaluating wireless network access connections via near field communications in accordance with the present invention are described with reference to the accompanying drawings, beginning with FIG. 1. FIG. 1 sets forth a block diagram of automated computing machinery comprising an example requesting device (202) useful in evaluating wireless network access connections via near field communications according to embodiments of the present invention. Evaluating wireless network access connections via near field communications according to embodiments of the present invention can be carried out, for example, by a requesting device (202) and one or more responding devices (224a, 224b). The requesting device (202) and the one or more responding devices (224a, 224b) may be embodied as computing devices that are configured for data communications over a data communications network. The requesting device (202) and the one or more responding devices (224a, 224b) may be embodied as mobile communications devices, laptop computers, tablet computers, and so on. Each computing device can be configured for data communications over a data communications network such as an IP network, a telecommunications network, and so on. The requesting device (202) and the one or more responding devices (224a, 224b) are also configured for data communications over a near field communications connection (228a, 228b), such as a BlueTooth™ connection, an NFC connection, and so on.

The example requesting device (202) of FIG. 1 includes a communications adapter (167) for data communications with other computers and network resources (226) over a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for evaluating wireless network access connections via near field communications according to embodiments of the present invention include modems for wired dial-up communications, Ethernet (IEEE 802.3) adapters for wired data communications network communications, and 802.11 adapters for wireless data communications network communications. The example requesting device (202) of FIG. 1 also includes an NFC Adapter (191). In the example of FIG. 1, the NFC Adapter (191) is a communications adapter for carrying out data communications using near field communications technologies such as BlueTooth™, NFC, and so on.

The requesting device (202) of FIG. 1 includes at least one computer processor (156) or 'CPU' as well as random access memory (168) ('RAM') which is connected through a high speed memory bus (166) and bus adapter (158) to processor (156) and to other components of the requesting device (202). Stored in RAM (168) is a wireless network evaluation module (126), a module of computer program instructions for evaluating wireless network access connections via near field communications according to embodiments of the present invention.

The wireless network evaluation module (126) of FIG. 1 is configured to evaluate wireless network access connections via near field communications by identifying one or more network connections available to the requesting device (202). The one or more network connections available to the requesting device (202) can include, for example, available WiFi connections. Each available WiFi connection represents a potential wireless connection between the requesting device (202) and a wireless access point that enables wireless devices such as the requesting device (202) to connect to a wired network. Identifying one or more network connections available to the requesting device (202) may be carried out, for example, through the use of connection management software installed on the requesting device (202). Such connection management software may identify one or more network connections available to the requesting device (202) through the use of a WiFi scanner that identifies wireless access points and various features of such a wireless access point such as signal strength, security requirements, and so on.

The wireless network evaluation module (126) of FIG. 1 is further configured to evaluate wireless network access connections via near field communications by requesting information describing the performance of the network connections experienced by the one or more responding devices (224a, 224b). Requesting information describing the performance of the network connections experienced by the one or more responding devices (224a, 224b) may be carried out using a near field communications connection (228a, 228b). For example, the requesting device (202) may send a request message (220a, 220b) for information describing the performance of the network connections experienced by the one or more responding devices (224a, 224b) over a BlueTooth™ connection between the requesting device (202) and the particular responding device (224a, 224b) that is the targeted recipient of the request message (220a, 220b). Such a request message (220a, 220b) can include, for example, an identification of the requesting device (202), an identification of the network connections that are available to the requesting device (202), a network address for the requesting device (202) that may be used for the responding devices (224a, 224b) to send a reply, and so on.

The physical distance over which a requesting device (202) can communicate with one or more responding devices (224a, 224b) via a near field communications connection (228a, 228b) is frequently much shorter than the physical distance over which a requesting device (202) can communicate with a wireless access point via the one or more network connections available to the requesting device (202). As such, responding devices (224a, 224b) that are close enough in physical proximity to the requesting device (202) so as to communicate with the requesting device (202) via a near field communications connection (228a, 228b) may serve as reliable sources of information regarding the level and quality of network connectivity that the requesting device (202) could experience if the requesting device (202) were to connect to the same wireless access point as the responding devices (224a, 224b).

Consider an example in which the requesting device (202) and the responding devices (224a, 224b) are laptop computers that include wireless network adapters. In such an example, assume that each device (202, 224a, 224b) are located in the same physical conference room such that the devices (202, 224a, 224b) can communicate via one or more near field communications connections (228a, 228b). Further assume that responding device (224a) is connected to wireless access point A and that responding device (224b) is connected to wireless access point B. Because the responding devices (224a, 224b) are relatively close in physical proximity to the requesting device (202), as evidenced by the fact that the devices (202, 224a, 224b) can communicate via one or more near field communications connections (228a, 228b), it is reasonable for the requesting device (202) to assume that it will experience a similar level of network connectivity when connecting to wireless access point A as is experienced by responding device (224a). Likewise, it is also reasonable for the requesting device (202) to assume that it will experience a similar level of network connectivity when connecting to wireless access point B as is experienced by responding device (224b). As such, the responding devices (224a, 224b) may serve as reliable sources of information regarding the level and quality of network connectivity that the requesting device (202) could experience if the requesting device (202) were to connect to the same wireless access point as the responding devices (224a, 224b).

Requesting information describing the performance of the network connections experienced by the one or more responding devices (224a, 224b) can include sending a request message (220a, 220b) that includes information (222a, 222b) describing the requesting device (202) and information (223a, 223b) identifying network resources (226) to be accessed by the requesting device (202). The information (222a, 222b) describing the requesting device (202) can include, for example, the type of network adapters installed on the requesting device (202), the location of the requesting device (202), and information describing various credentials associated with the requesting device (202). Such information describing various credentials associated with the requesting device (202) can include, for example, information identifying the virtual private networks ('VPNs') that the requesting device (202) is authorized to access, information identifying secure network resources that the requesting device (202) is authorized to access, and so on. The information (223a, 223b) identifying network resources (226) to be accessed by the requesting device (202) can include, for example, an identifier of the network resources (226) to be accessed by the requesting device (202), a network address for the network resources (226) to be accessed by the requesting device (202), and the like.

The wireless network evaluation module (126) of FIG. 1 is further configured to evaluate wireless network access connections via near field communications by receiving the information describing the performance of the network connections experienced by the one or more responding devices (224a, 224b). Receiving the information describing the performance of the network connections experienced by the one or more responding devices (224a, 224b) may be carried out by receiving a response message from the responding devices (224a, 224b) via the one or more near field communications connections (228a, 228b). The information describing the performance of the network connections experienced by the one or more responding devices (224a, 224b) may include, for example, an identifier of a wireless access point that the responding device (224a, 224b) is connected to, an average transmission rate for data communications between a particular responding device (224a, 224b) and the wireless access point that the responding device (224a, 224b) is connected to, the number of network hops required for the responding device (224a, 224b) to access a particular network resource (226) via the responding device's (224a, 224b) network connection, and so on.

The information describing the performance of the network connections experienced by the one or more responding devices (224a, 224b) can include information describing the one or more responding devices (224a, 224b). The information describing the one or more responding devices (224a, 224b) can include, for example, the type of network adapters installed on the responding devices (224a, 224b), the location of the responding devices (224a, 224b), and information describing various credentials associated with the responding devices (224a, 224b). Such information describing various credentials associated with the responding devices (224a, 224b) can include, for example, information identifying the VPNs that the responding devices (224a, 224b) is authorized to access, information identifying secure network resources that the responding devices (224a, 224b) is authorized to access, and so on.

Consider an example in which the requesting device (202) needs to access a protected network resource (226) that is only accessible by members of a particular group. In such an example, assume that the requesting device (202) therefore requests information describing the extent to which the protected network resource (226) can be accessed by one or more responding devices (224a, 224b) via a network connection that is being used by each of the one or more responding devices (224a, 224b). Further assume that a particular responding device (224a) is not a member of the particular group that can access the network resource (226). In such an example, the responding device (224a) will indicate that it is not able to access the network resource (226) over the network connection that is being used by the responding device (224a). The fact that the responding device (224a) is not able to access the network resource (226) over the network connection that is being used by the responding device (224a), however, is not an indication that the network connection that is being used by the responding device (224a) cannot provide reliable access to the network resource (226). By receiving information (214, 218) describing the one or more responding devices (224a, 224b), the requesting device (202) may be able to identify the responding devices (224a, 224b) whose information (212, 216) describing the performance of the network connections experienced by the one or more responding devices (224a, 224b) should be considered for the purposes of identifying a preferred network connection. In the example described above, the requesting device (202) may simply ignore the information describing the performance of the network connections experienced by the one or more responding devices (224a, 224b) for those responding devices (224a, 224b) that do not have access to a particular network resource (226) by virtue of a lack of credentials.

The information describing the performance of the network connections experienced by the one or more responding devices (224a, 224b) can also include information describing availability to a particular network resource (226). The availability to a particular network resource (226) may include, for example, information identifying the bandwidth that a responding device (224a, 224b) could transfer information to and from the network resource (226) over its network connection, the percentage of time that the responding device (224a, 224b) could transfer information to and from the network resource (226) over its network connection, the number of network hops that were required for the responding device (224a, 224b) to transfer information to and from the network resource (226) over its network connection, and so on. In such an example, the information describing the availability to a particular network resource (226) from the perspective of a responding device (224a, 224b) that is utilizing a particular network connection may be of particular interest to the requesting device (202), for example, if the requesting device (202) is establishing a network connection to access the particular network resource (226).

Consider an example in which the requesting device (202) is attempting to access a particular database located on a particular network resource (226). In such an example, the extent to which the one or more responding devices (224a, 224b) are able to access the database located on a particular network resource (226) via their network connections if of particular interest to the requesting device (202), whereas the extent to which the one or more responding devices (224a, 224b) are able to access another network resource is of less interest to the requesting device (202). By receiving information describing availability to a particular network resource (226), the requesting device (202) may therefore utilize this information when evaluating the network connections utilized by the one or more responding devices (224a, 224b).

The wireless network evaluation module (126) of FIG. 1 is further configured to evaluate wireless network access connections via near field communications by connecting to a preferred network connection in dependence upon the information describing the performance of the network connections experienced by the one or more responding devices (224a, 224b). A preferred network connection represents a network connection that is available to the requesting device (202) and a network connection that offers superior connectivity as indicated by the information describing the performance of the network connections experienced by the one or more responding devices (224a, 224b). A network connection may offer 'superior connectivity' as indicated by the information describing the performance of the network connections experienced by the one or more responding devices (224a, 224b) in a variety of ways. For example, the network connection that had the highest average transfer rate as indicated by the information describing the performance of the network connections experienced by the one or more responding devices (224a, 224b) may be identified as being the preferred network connection. Alternatively, the network connection that had the lowest average response time as indicated by the information describing the performance of the network connections experienced by the one or more responding devices (224a, 224b) may be identified as being the preferred network connection. Readers will appreciate that any number of metrics, including but not limited to, the number of network hops, reliability metrics, or any combination of any of the metrics described herein and contained in the information describing the performance of the network connections experienced by the one or more responding devices (224a, 224b) may be utilized to identify a preferred network connection for the requesting device (202).

Also stored in RAM (168) of the requesting device (202) is an operating system (154). Operating systems useful evaluating wireless network access connections via near field communications according to embodiments of the present invention include UNIX™, Linux™, Microsoft XP™, AIX™, IBM's i5/OS™, and others as will occur to those of skill in the art. The operating system (154) and the wireless network evaluation module (126) in the example of FIG. 1 are shown in RAM (168), but many components of such software typically are stored in non-volatile memory also, such as, for example, on a disk drive (170).

The requesting device (202) of FIG. 1 includes disk drive adapter (172) coupled through expansion bus (160) and bus adapter (158) to processor (156) and other components of the requesting device (202). Disk drive adapter (172) connects non-volatile data storage to the requesting device (202) in the form of disk drive (170). Disk drive adapters useful in computers for evaluating wireless network access connections via near field communications according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example requesting device (202) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example requesting device (202) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

Figure 2:
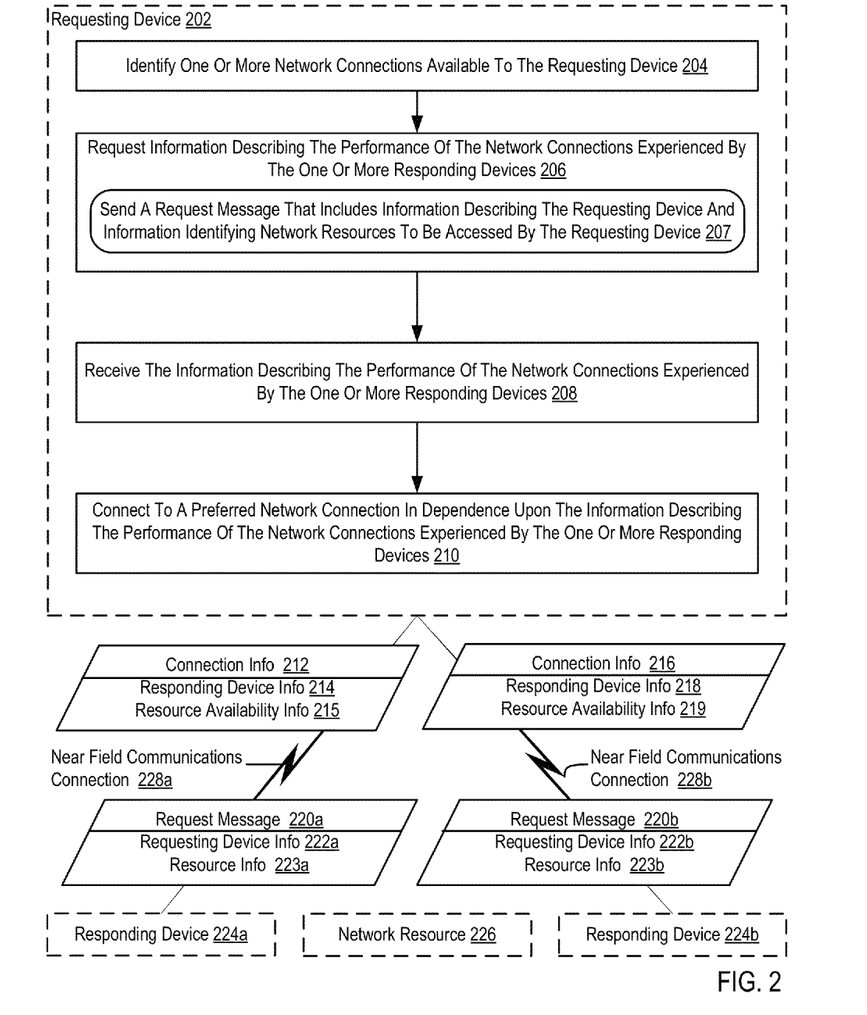
FIG. 2 sets forth a flow chart illustrating an example method for evaluating wireless network access connections via near field communications according to embodiments of the present invention.

For further explanation, FIG. 2 sets forth a flow chart illustrating an example method for evaluating wireless network access connections via near field communications according to embodiments of the present invention. The example method of FIG. 2 includes a requesting device (202) and one or more responding devices (224a, 224b). The requesting device (202) and the one or more responding devices (224a, 224b) may be embodied as computing devices that are configured for data communications over a data communications network. The requesting device (202) and the one or more responding devices (224a, 224b) may be embodied as mobile communications devices, laptop computers, tablet computers, and so on. Each computing device can be configured for data communications over a data communications network such as an IP network, a telecommunications network, and so on. In the example method of FIG. 2, the requesting device (202) and the one or more responding devices (224a, 224b) are also configured for data communications over a near field communications connection (228a, 228b), such as a BlueTooth™ connection, an NFC connection, and so on.

The example method of FIG. 2 includes identifying (204), by a requesting device (202), one or more network connections available to the requesting device (202). In the example method of FIG. 2, the one or more network connections available to the requesting device (202) can include, for example, available WiFi connections. Each available WiFi connection represents a potential wireless connection between the requesting device (202) and a wireless access point that enables wireless devices such as the requesting device (202) to connect to a wired network. In the example method of FIG. 2, identifying (204) one or more network connections available to the requesting device (202) may be carried out, for example, through the use of connection management software installed on the requesting device (202). Such connection management software may identify one or more network connections available to the requesting device (202) through the use of a WiFi scanner that identifies wireless access points and various features of such a wireless access point such as signal strength, security requirements, and so on.

The example method of FIG. 2 also includes requesting (206) information describing the performance of the network connections experienced by the one or more responding devices (224a, 224b). In the example method of FIG. 2, requesting (206) information describing the performance of the network connections experienced by the one or more responding devices (224a, 224b) may be carried out using a near field communications connection (228a, 228b). For example, the requesting device (202) may send a request message (220a, 220b) for information describing the performance of the network connections experienced by the one or more responding devices (224a, 224b) over a BlueTooth™ connection between the requesting device (202) and the particular responding device (224a, 224b) that is the targeted recipient of the request message (220a, 220b). Such a request message (220a, 220b) can include, for example, an identification of the requesting device (202), an identification of the network connections that are available to the requesting device (202), a network address for the requesting device (202) that may be used for the responding devices (224a, 224b) to send a reply, and so on.

In the example method of FIG. 2, the physical distance over which a requesting device (202) can communicate with one or more responding devices (224a, 224b) via a near field communications connection (228a, 228b) is frequently much shorter than the physical distance over which a requesting device (202) can communicate with a wireless access point via the one or more network connections available to the requesting device (202). As such, responding devices (224a, 224b) that are close enough in physical proximity to the requesting device (202) so as to communicate with the requesting device (202) via a near field communications connection (228a, 228b) may serve as reliable sources of information regarding the level and quality of network connectivity that the requesting device (202) could experience if the requesting device (202) were to connect to the same wireless access point as the responding devices (224a, 224b).

Consider an example in which the requesting device (202) and the responding devices (224a, 224b) are laptop computers that include wireless network adapters. In such an example, assume that each device (202, 224a, 224b) are located in the same physical conference room such that the devices (202, 224a, 224b) can communicate via one or more near field communications connections (228a, 228b). Further assume that responding device (224a) is connected to wireless access point A and that responding device (224b) is connected to wireless access point B. Because the responding devices (224a, 224b) are relatively close in physical proximity to the requesting device (202), as evidenced by the fact that the devices (202, 224a, 224b) can communicate via one or more near field communications connections (228a, 228b), it is reasonable for the requesting device (202) to assume that it will experience a similar level of network connectivity when connecting to wireless access point A as is experienced by responding device (224a). Likewise, it is also reasonable for the requesting device (202) to assume that it will experience a similar level of network connectivity when connecting to wireless access point B as is experienced by responding device (224b). As such, the responding devices (224a, 224b) may serve as reliable sources of information regarding the level and quality of network connectivity that the requesting device (202) could experience if the requesting device (202) were to connect to the same wireless access point as the responding devices (224a, 224b).

In the example method of FIG. 2, requesting (206) information describing the performance of the network connections experienced by the one or more responding devices (224a, 224b) can include sending (207) a request message (220a, 220b) that includes information (222a, 222b) describing the requesting device (202) and information (223a, 223b) identifying network resources (226) to be accessed by the requesting device (202). In the example method of FIG. 2, information (222a, 222b) describing the requesting device (202) can include, for example, the type of network adapters installed on the requesting device (202), the location of the requesting device (202), and information describing various credentials associated with the requesting device (202). Such information describing various credentials associated with the requesting device (202) can include, for example, information identifying the VPNs that the requesting device (202) is authorized to access, information identifying secure network resources that the requesting device (202) is authorized to access, and so on. The information (223a, 223b) identifying network resources (226) to be accessed by the requesting device (202) can include, for example, an identifier of the network resources (226) to be accessed by the requesting device (202), a network address for the network resources (226) to be accessed by the requesting device (202), and the like.

The example method of FIG. 2 also includes receiving (208), by the requesting device (202), the information (212, 216) describing the performance of the network connections experienced by the one or more responding devices (224a, 224b). In the example method of FIG. 2, receiving (208) the information (212, 216) describing the performance of the network connections experienced by the one or more responding devices (224a, 224b) may be carried out by receiving a response message from the responding devices (224a, 224b) via the one or more near field communications connections (228a, 228b). The information (212, 216) describing the performance of the network connections experienced by the one or more responding devices (224a, 224b) may include, for example, an identifier of a wireless access point that the responding device (224a, 224b) is connected to, an average transmission rate for data communications between a particular responding device (224a, 224b) and the wireless access point that the responding device (224a, 224b) is connected to, the number of network hops required for the responding device (224a, 224b) to access a particular network resource (226) via the responding device's (224a, 224b) network connection, and so on.

In the example method of FIG. 2 the information (212, 216) describing the performance of the network connections experienced by the one or more responding devices (224a, 224b) can include information (214, 218) describing the one or more responding devices (224a, 224b). In the example method of FIG. 2, the information (214, 218) describing the one or more responding devices (224a, 224b) can include, for example, the type of network adapters installed on the responding devices (224a, 224b), the location of the responding devices (224a, 224b), and information describing various credentials associated with the responding devices (224a, 224b). Such information describing various credentials associated with the responding devices (224a, 224b) can include, for example, information identifying the VPNs that the responding devices (224a, 224b) is authorized to access, information identifying secure network resources that the responding devices (224a, 224b) is authorized to access, and so on.

Consider an example in which the requesting device (202) needs to access a protected network resource (226) that is only accessible by members of a particular group. In such an example, assume that the requesting device (202) therefore requests information describing the extent to which the protected network resource (226) can be accessed by one or more responding devices (224a, 224b) via a network connection that is being used by each of the one or more responding devices (224a, 224b). Further assume that a particular responding device (224a) is not a member of the particular group that can access the network resource (226). In such an example, the responding device (224a) will indicate that it is not able to access the network resource (226) over the network connection that is being used by the responding device (224a). The fact that the responding device (224a) is not able to access the network resource (226) over the network connection that is being used by the responding device (224a), however, is not an indication that the network connection that is being used by the responding device (224a) cannot provide reliable access to the network resource (226). By receiving information (214, 218) describing the one or more responding devices (224a, 224b), the requesting device (202) may be able to identify the responding devices (224a, 224b) whose information (212, 216) describing the performance of the network connections experienced by the one or more responding devices (224a, 224b) should be considered for the purposes of identifying a preferred network connection. In the example described above, the requesting device (202) may simply ignore the information (212, 216) describing the performance of the network connections experienced by the one or more responding devices (224a, 224b) for those responding devices (224a, 224b) that do not have access to a particular network resource (226) by virtue of a lack of credentials.

In the example method of FIG. 2 the information (212, 216) describing the performance of the network connections experienced by the one or more responding devices (224a, 224b) can also include information (215, 219) describing availability to a particular network resource (226). In the example method of FIG. 2, the availability to a particular network resource (226) may include, for example, information identifying the bandwidth that a responding device (224a, 224b) could transfer information to and from the network resource (226) over its network connection, the percentage of time that the responding device (224a, 224b) could transfer information to and from the network resource (226) over its network connection, the number of network hops that were required for the responding device (224a, 224b) to transfer information to and from the network resource (226) over its network connection, and so on. In such an example, such information (215, 219) describing the availability to a particular network resource (226) from the perspective of a responding device (224a, 224b) that is utilizing a particular network connection may be of particular interest to the requesting device (202), for example, if the requesting device (202) is establishing a network connection to access the particular network resource (226).

Consider an example in which the requesting device (202) is attempting to access a particular database located on a particular network resource (226). In such an example, the extent to which the one or more responding devices (224a, 224b) are able to access the database located on a particular network resource (226) via their network connections if of particular interest to the requesting device (202), whereas the extent to which the one or more responding devices (224a, 224b) are able to access another network resource is of less interest to the requesting device (202). By receiving information (215, 219) describing availability to a particular network resource (226), the requesting device (202) may therefore utilize this information (215, 219) when evaluating the network connections utilized by the one or more responding devices (224a, 224b).

The example method of FIG. 2 also includes connecting (210), by the requesting device (202), to a preferred network connection in dependence upon the information (212, 216) describing the performance of the network connections experienced by the one or more responding devices (224a, 224b). In the example method of FIG. 2, a preferred network connection represents a network connection that is available to the requesting device (202) and a network connection that offers superior connectivity as indicated by the information (212, 216) describing the performance of the network connections experienced by the one or more responding devices (224a, 224b). In the example method of FIG. 2, a network connection may offer 'superior connectivity' as indicated by the information (212, 216) describing the performance of the network connections experienced by the one or more responding devices (224a, 224b) in a variety of ways. For example, the network connection that had the highest average transfer rate as indicated by the information (212, 216) describing the performance of the network connections experienced by the one or more responding devices (224a, 224b) may be identified as being the preferred network connection. Alternatively, the network connection that had the lowest average response time as indicated by the information (212, 216) describing the performance of the network connections experienced by the one or more responding devices (224a, 224b) may be identified as being the preferred network connection. Readers will appreciate that any number of metrics, including but not limited to, the number of network hops, reliability metrics, or any combination of any of the metrics described herein and contained in the information (212, 216) describing the performance of the network connections experienced by the one or more responding devices (224a, 224b) may be utilized to identify a preferred network connection for the requesting device (202).

Figure 3:
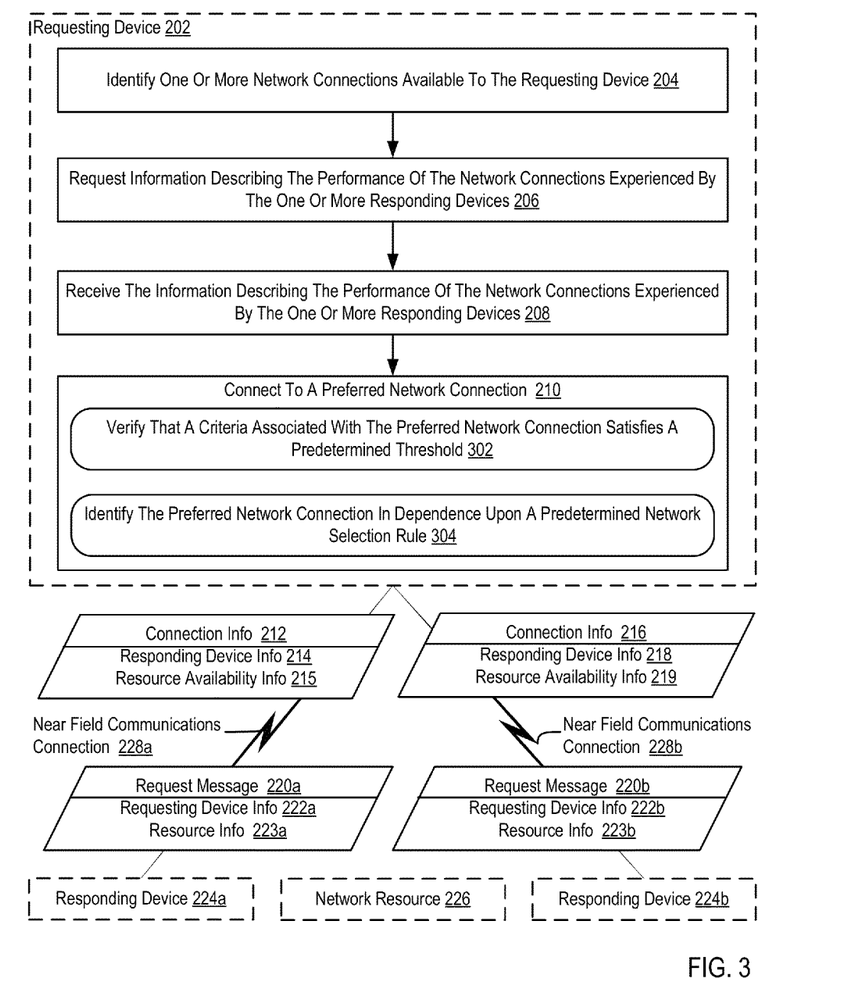
FIG. 3 sets forth a flow chart illustrating an example method for evaluating wireless network access connections via near field communications according to embodiments of the present invention.

For further explanation, FIG. 3 sets forth a further flow chart illustrating an example method for evaluating wireless network access connections via near field communications according to embodiments of the present invention. The example method of FIG. 3 is similar to the example method of FIG. 2 as it also includes identifying (204) one or more network connections available to the requesting device (202), requesting (206) information describing the performance of the network connections experienced by the one or more responding devices (224a, 224b), receiving (208) the information (212, 216) describing the performance of the network connections experienced by the one or more responding devices (224a, 224b), and connecting (210) to a preferred network connection in dependence upon the information (212, 216) describing the performance of the network connections experienced by the one or more responding devices (224a, 224b).

In the example method of FIG. 3, connecting (210) to a preferred network connection in dependence upon the information (212, 216) describing the performance of the network connections experienced by the one or more responding devices (224a, 224b) can include identifying (304) the preferred network connection in dependence upon a predetermined network selection rule. In the example method of FIG. 3, the predetermined network selection rule represents an algorithm for identifying the preferred network connection based on a plurality of criterion contained in the information (212, 216) describing the performance of the network connections experienced by the one or more responding devices (224a, 224b). For example, a user of the requesting device (202) may place a greater priority on network reliability rather than bandwidth. In such an example, the predetermined network selection rule may therefore be set such that a network reliability rating that is contained in the information (212, 216) describing the performance of the network connections experienced by the one or more responding devices (224a, 224b) is given a greater weighting that the data transmission rate contained in the information (212, 216) describing the performance of the network connections experienced by the one or more responding devices (224a, 224b). Identifying (304) the preferred network connection in dependence upon a predetermined network selection rule may therefore be carried out by calculating a score for each network connection by applying the predetermined network selection rule to the information (212, 216) describing the performance of the network connections experienced by the one or more responding devices (224a, 224b).

In the example method of FIG. 3, connecting (210) to a preferred network connection in dependence upon the information (212, 216) describing the performance of the network connections experienced by the one or more responding devices (224a, 224b) can alternatively include verifying (302) that a criteria associated with the preferred network connection satisfies a predetermined threshold.

Consider an example in which a user of requesting device (202) intends to stream live video content to the requesting device. In such an example, connections that provide for low levels of bandwidth are entirely inadequate for such an activity, regardless of network reliability and other considerations. The data transfer rate associated with various connections, as contained in the information (212, 216) describing the performance of the network connections experienced by the one or more responding devices (224a, 224b), may therefore be compared to a predetermined threshold such that only those connections that provide the requisite bandwidth will be candidate connections for the requesting device (202). Other criteria that may be compared to the predetermined threshold can include, for example, availability of a predetermined network resource (226), network reliability ratings, and others as will occur to those of skill in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for evaluating wireless network access connections via near field communications, the apparatus comprising a computer processor, a computer memory operatively coupled to the computer processor, the computer memory having disposed within it computer program instructions that, when executed by the computer processor, cause the apparatus to carry out the steps of:

identifying, by a requesting device, at least two network connections available to the requesting device;

requesting, by the requesting device to one or more responding devices using a near field communications connection, metrics describing performance of the at least two network connections experienced by the one or more responding devices;

receiving, by the requesting device, the metrics describing the performance of the at least two network connections experienced by the one or more responding devices;

identifying, by the requesting device, a preferred network connection from the at least two network connections experienced by the one or more responding devices, wherein identifying the preferred network connection comprises:

applying, by the requesting device, a predetermined network selection rule to the metrics describing the performance of the at least two network connections experienced by the one or more responding devices; and connecting, by the requesting device, to the preferred network connection.

2. The apparatus of claim 1 wherein requesting, by the requesting device to one or more responding devices using a near field communications connection, metrics describing the performance of the network connections experienced by the one or more responding devices includes sending a request message that includes information describing the requesting device and information identifying network resources to be accessed by the requesting device.

3. The apparatus of claim 1 wherein the metrics describing the performance of the network connections experienced by the one or more responding devices includes information describing the one or more responding devices.

4. The apparatus of claim 1 wherein the metrics describing the performance of the network connections experienced by the one or more responding devices includes information describing availability to a particular network resource.

5. The apparatus of claim 1 wherein connecting, by the requesting device, to a preferred network connection in dependence upon the metrics describing the performance of the network connections experienced by the one or more responding devices further comprises verifying that a criteria associated with the preferred network connection satisfies a predetermined threshold.

6. A computer program product for evaluating wireless network access connections via near field communications, the computer program product disposed upon a non-transitory computer readable medium, the computer program product comprising computer program instructions that, when executed, cause a computer to carry out the steps of:

identifying, by a requesting device, at least two network connections available to the requesting device;

requesting, by the requesting device to one or more responding devices using a near field communications connection, metrics describing performance of the at least two network connections experienced by the one or more responding devices;

receiving, by the requesting device, the metrics describing the performance of the at least two network connections experienced by the one or more responding devices;

identifying, by the requesting device, a preferred network connection from the at least two network connections experienced by the one or more responding devices, wherein identifying the preferred network connection comprises:

applying, by the requesting device, a predetermined network selection rule to the metrics describing the performance of the at least two network connections experienced by the one or more responding devices; and     connecting, by the requesting device, to the preferred network connection.

7. The computer program product of claim 6 wherein requesting, by the requesting device to one or more responding devices using a near field communications connection, metrics describing the performance of the network connections experienced by the one or more responding devices includes sending a request message that includes information describing the requesting device and information identifying network resources to be accessed by the requesting device.

8. The computer program product of claim 6 wherein the metrics describing the performance of the network connections experienced by the one or more responding devices includes information describing the one or more responding devices.

9. The computer program product of claim 6 wherein the metrics describing the performance of the network connections experienced by the one or more responding devices includes information describing availability to a particular network resource.

10. The computer program product of claim 6 wherein connecting, by the requesting device, to a preferred network connection in dependence upon the metrics describing the performance of the network connections experienced by the one or more responding devices further comprises verifying that a criteria associated with the preferred network connection satisfies a predetermined threshold.

11. The computer program product of claim 6 wherein the computer readable medium comprises a storage medium.

\* \* \* \* \*